No. 760,149. PATENTED MAY 17, 1904.
H. M. RAMER.
HAY RAKE.
APPLICATION FILED NOV. 5, 1903.
NO MODEL. 2 SHEETS—SHEET 2.
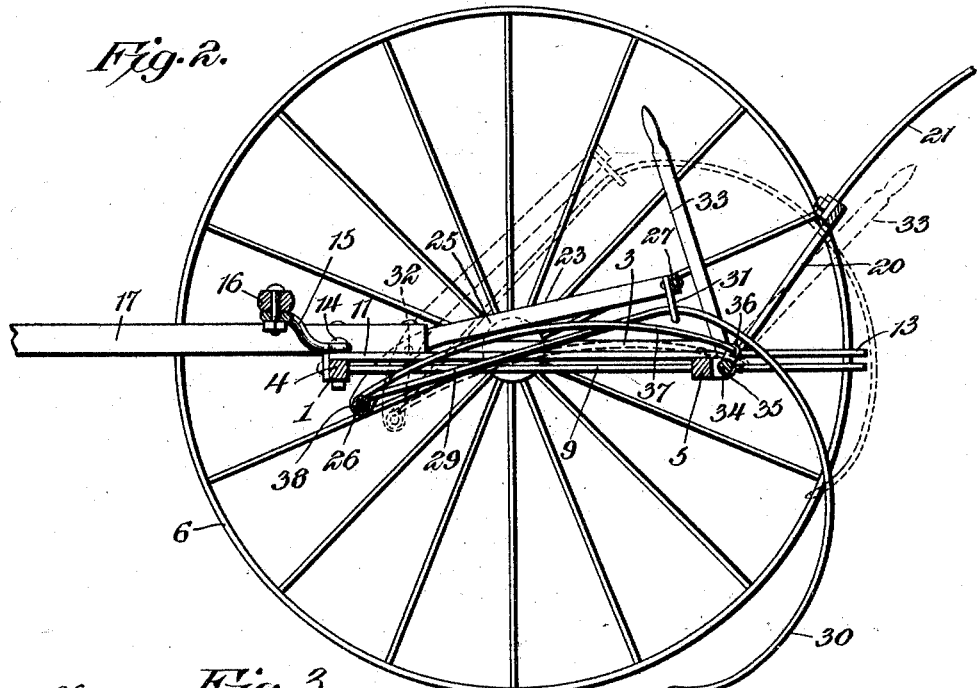
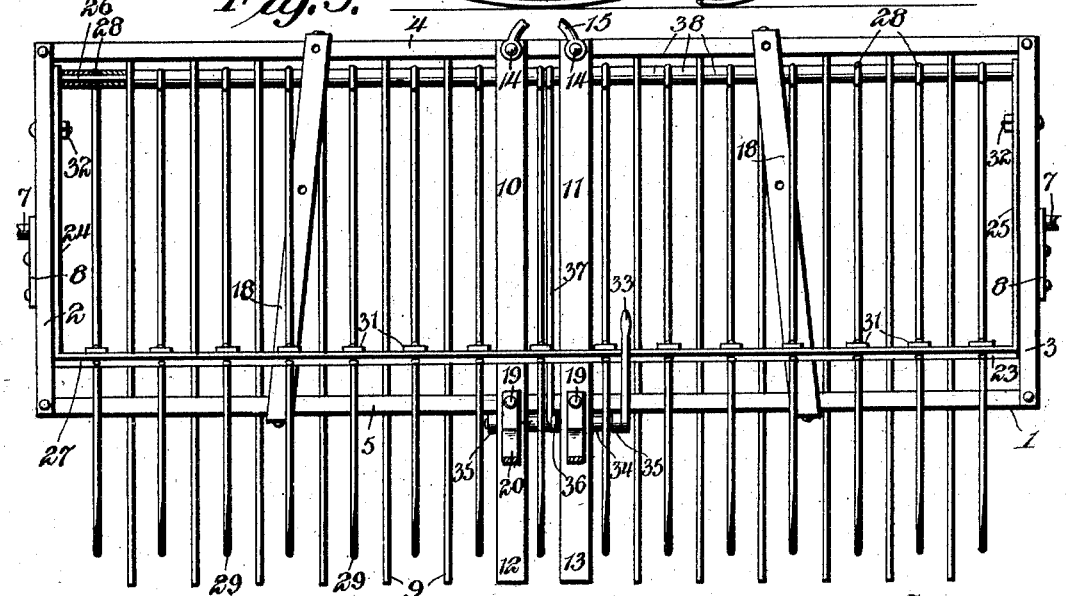
Henry M. Ramer, Inventor,
Witnesses
Howard D. Orr
Louis G. Julihn No. 760,149.

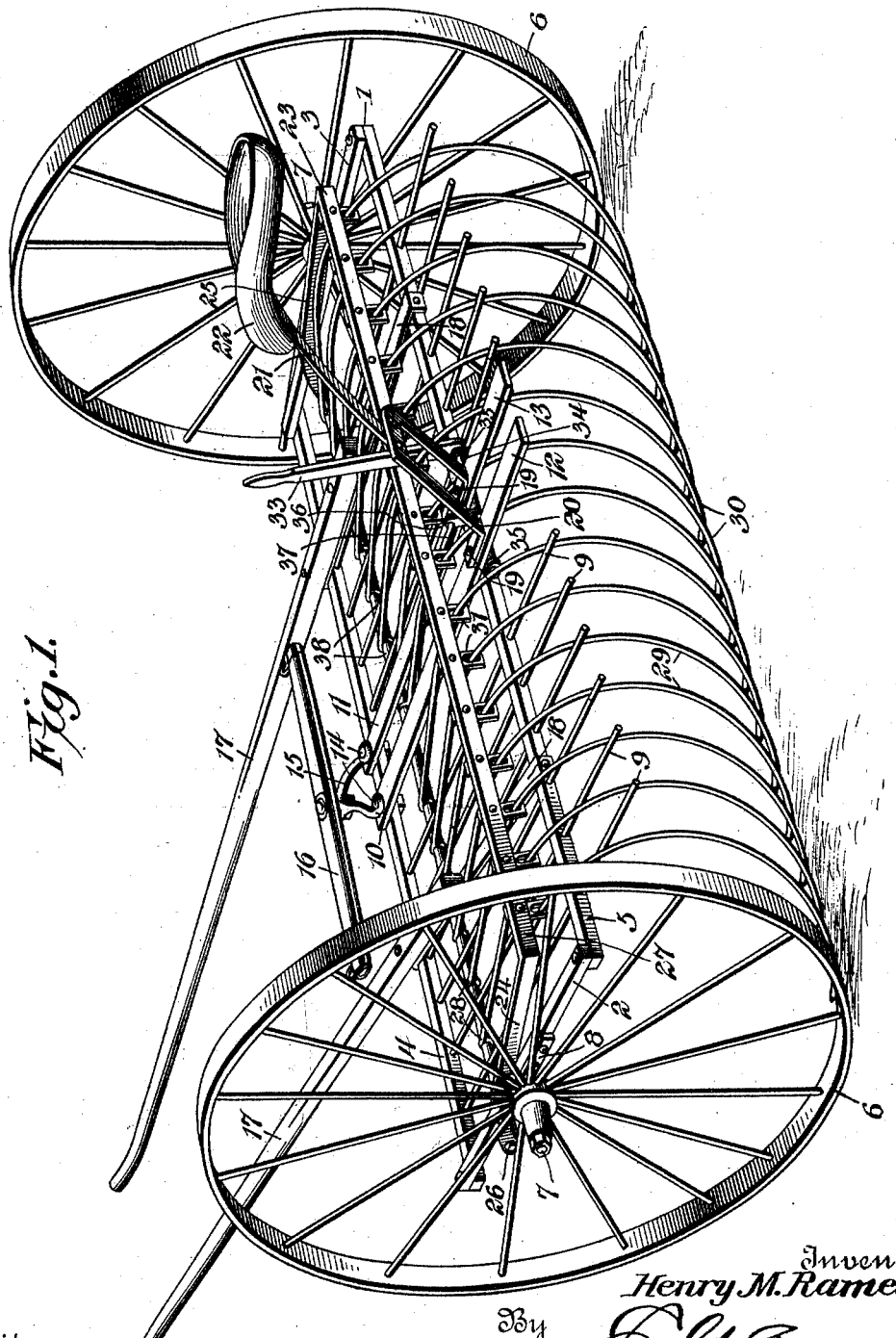

Patented May 17, 1904.

UNITED STATES PATENT OFFICE.

HENRY M. RAMER, OF LABOTT, PENNSYLVANIA.

HAY-RAKE.

SPECIFICATION forming part of Letters Patent No. 760,149, dated May 17, 1904.

Application filed November 5 1903. Serial No. 179,978. (No model.)

*To all whom it may concern:*

Be it known that I, HENRY M. RAMER, a citizen of the United States, residing at Labott, in the county of York and State of Pennsylvania, have invented a new and useful Hay-Rake, of which the following is a specification.

My present invention relates to a novel hay-rake, the object being to produce an efficient rake of simple, durable, and inexpensive construction, the various parts being assembled in a manner to facilitate their displacement for repair and their replacement without necessitating the employment of skilled labor.

A further object of the invention is to improve the mounting of the rake-teeth and the means for effecting their elevation to dump the hay.

Subordinate to the objects stated are various others, which will more fully appear during the succeeding description of the illustrated embodiment of the invention.

In the accompanying drawings, Figure 1 is a perspective view of my rake complete. Fig. 2 is a vertical transverse sectional view showing in dotted lines the positions assumed by the parts when the hay is dumped; and Fig. 3 is a plan view of the rake, showing the seat-bracket in section and omitting the draft appliance.

Like numerals are employed to designate corresponding parts throughout the several views.

The main frame 1 of the machine is of oblong form and is preferably composed of square metal side bars 2 and 3 and front and rear bars 4 and 5, connected to the side bars by bolts or other suitable securing means. This light open metal frame is carried by wheels 6, mounted on trunnions 7, extending from wheel-brackets 8, bolted to the end bars 2 and 3, as shown.

The main frame 1 of the machine I shall designate as the "comb-frame," for the reason that it rigidly carries a comb made up of a series of comb-teeth 9, each of which passes through the front and rear bars 4 and 5, and is extended a considerable distance beyond the latter for the purpose of clearing the rake-teeth when the hay is dumped, in a manner to be described.

The main frame 1 is provided midway of the ends thereof with a pair of parallel strips 10 and 11, bolted securely to the bars 4 and 5 and extended a considerable distance in rear of the bar 5 to form foot-rests 12 and 13, and designed, furthermore, to perform the function of comb-teeth, two of which are omitted at the middle of the series to accommodate these bars or strips.

The bolts 14, which secure the front ends of the strips 10 and 11 to the front bar 4 of the main frame, also serve as attaching means for a swingletree-bracket 15, which carries the swingletree 16, located between the shafts 17. The rear ends of the shafts or thills 17 diverge in the usual manner and are bolted to shaft-supporting bars 18, bolted at their opposite ends to the front and rear bars of the main frame. The bolts 19, which connect the strips 10 and 11 to the bar 5, serve the additional function of securing means for a seat-bracket 20 of substantially inverted-U shape and having attached thereto the seat-spring 21, carrying the seat 22. The bracket 20 and the seat-spring 21 are rearwardly inclined, as clearly shown in Fig. 1, in order to locate the seat in proper relation to the foot-rests 12 and 13.

The main frame 1 of the machine also supports a pivoted rake-frame 23, which is of light open construction and comprises end bars 24 and 25 and front and rear bars 26 and 27. The bars 24, 25, and 27 are preferably integral, being formed from a single strip of metal bent into the desired shape, and the front bar 26 is preferably of cylindrical form, inasmuch as it is designed to be encircled by the eye 28 of a series of rake-teeth 29, which latter are capable of limited independent swinging movement from the bar 26 as an axis. The rake-teeth are formed, as shown in Fig. 2, with their rear ends 30 curved down into close proximity to the ground and are passed through short guide-loops 31, secured to and depending from the rear bar 27 of the rake-frame, as best shown in Fig. 1. The rake-teeth are in alternating arrangement with the teeth of the comb, and their independent vertical movement is limited by the guide-loops. In order to permit the rake-teeth to be elevated in unison for the purpose of dumping the hay, a rake-frame is pivotally mounted in the main frame of the machine, this pivotal connection being preferably effected by means of bolts 32, passed through the end bars 22 and 23 adjacent to their front ends and also through the end bars 24 and 25 of the rake-frame adjacent to the front bar 26.

In order to locate the front side of the rake-frame in a plane sufficiently below the comb-teeth to prevent interference therewith, the front ends of the bars 24 and 25 are bent down or deflected, as shown in Fig. 2. It will now be apparent that as the rake is drawn over the field the individual rake-teeth may swing sufficiently to avoid breakage in passing over uneven or stony ground and that the rake may be elevated to dump the hay by imparting sufficient swinging movement to the rake-frame.

Various devices for swinging the rake-frame may be provided; but I prefer to employ a lever 33, fixed to one end of a crank-shaft 34, mounted in bearing-lugs 35, which are preferably cast upon the rear side of the front bar 5. To the crank 36 of the shaft 34 is attached one end of a longitudinally-curved link or connecting-bar 37, the opposite end of which is connected to the front bar 26 of the rake-frame. The parts normally occupy the positions indicated in Fig. 2; but when it is desired to dump a load of hay accumulated in advance of the rake-teeth the lever 33 is drawn back to the position indicated in dotted lines in Fig. 2, this movement serving to rock the shaft 34, which will thus draw down and back the front end of the rake-frame, tilting the latter to the position indicated in dotted lines in Fig. 2 and elevating the rake-teeth sufficiently to dump the hay, the rake-teeth being cleared in an obvious manner by the teeth 9 of the comb.

Particular attention is now directed to the absence of a latch or other locking device for the lever 33. The necessity for employing separate locking means is avoided by so disposing the crank 36 that the point of connection between it and the connecting rod or link 37 will be substantially in line with the axes of the shaft 34 and the frame-bar 26 when the lever is drawn back. In order to keep the rake-teeth properly spaced apart, spacing-sleeves 38 are interposed between the eyes 28, as shown in Fig. 3.

It is thought that from the foregoing the construction, mode of manipulation, and many advantages of my rake will be clearly comprehended; but while the present embodiment of the invention appears at this time to be preferable I desire to be distinctly understood as reserving the right to effect such changes, modifications, and variations of the illustrated structure as may come fairly within the scope of the protection prayed.

What I claim is—

1. In a rake, the combination with carrying-wheels, of a pair of pivotally-connected rectangular frames carried thereby, rake-teeth carried by one of said frames, comb-teeth carried by the other frame and having alternating arrangement with the rake-teeth, and an operating device mounted on the rear side of the comb-frame and operatively connected to the front side of the rake-frame to swing the latter.

2. In a rake, the combination with carrying-wheels, of an oblong comb-frame, a pair of strips disposed transversely of the frame and extended beyond the rear side thereof to form foot-rests, a seat-bracket bolted to said strips in advance of the foot-rests, a seat carried by the bracket, and a rake-frame pivotally mounted in the comb-frame.

3. In a rake, the combination with an oblong comb-frame, horizontal comb-teeth extended transversely across the frame and beyond the rear side thereof, an oblong rake-frame pivotally mounted in the comb-frame adjacent to the front side of the latter, rake-teeth extended transversely across the rake-frame and having their rear ends located between the comb-teeth, and means for swinging the rake-frame.

4. In a rake, the combination with a comb-frame, a rake-frame pivotally mounted therein, rake-teeth carried by the rake-frame and comb-teeth extending rearwardly from the comb-frame, of a crank-shaft mounted at the rear side of the comb-frame, a connecting-rod connecting the crank of said shaft with the front bar of the rake-frame, and a lever connected to the crank-shaft and arranged to swing the crank-shaft for the purpose of swinging the rake-frame, the parts being arranged to present the crank in rear of the shaft for the purpose of holding the rake-frame in its elevated position.

5. In a rake, the combination with carrying-wheels, of a rectangular comb-frame supported thereby and provided with comb-teeth, a rectangular rake-frame pivotally mounted in the comb-frame, said pivotal mounting being adjacent to the front side of both frames, rake-teeth mounted in the rake-frame and alternating with the comb-teeth, and means for swinging the rake-frame.

6. In a rake, the combination with carrying-wheels, of a rectangular comb-frame supported thereby and equipped with comb-teeth, a rake-frame having pivotal connection at a point intermediate of the front and rear sides thereof with the comb-frame, rake-teeth mounted in the rake-frame and alternating with the comb-teeth, and a rake-elevating means mounted on the comb-frame at the rear side thereof and having connection with the rake-frame at a point in advance of its pivot.

7. In a rake, the combination with carrying-wheels, of a rectangular comb-frame supported thereby and equipped with comb-teeth, a rectangular rake-frame pivotally mounted in the comb-frame and having its front and rear bars located respectively below and above the comb-teeth, rake-teeth carried by the rake-frame and alternating with the comb-teeth, and means for swinging the rake-frame.

8. In a rake, the combination with carrying-wheels, of a rectangular comb-frame supported thereby and equipped with comb-teeth, a rectangular rake-frame pivotally mounted in the comb-frame and having its front and rear bars located respectively below and above the comb-teeth, rake-teeth carried by the rake-frame and alternating with the comb-teeth, and a rake-elevating device mounted at the rear side of the comb-frame and having operative connection with the front bar of the rake-frame.

9. In a rake, the combination with carrying-wheels, and a rectangular comb-frame supported thereby and equipped with comb-teeth extending across said frame from front to rear thereof and also extending beyond the rear side of the comb-frame, of a rectangular rake-frame pivotally mounted intermediate of its front and rear bars in the comb-frame, the front and rear bars of the rake-frame being located respectively above and below the comb-teeth, guide-loops carried by the rear bar of the rake-frame, rake-teeth passed through said guide-loops and having terminal eyes receiving the front bar of the rake-frame, a lever supported by the comb-frame at the rear side thereof, and means including a link for connecting the lever with the front bar of the rake-frame to swing the latter.

In testimony that I claim the foregoing as my own I have hereto affixed my signature in the presence of two witnesses.

HENRY M. RAMER.

Witnesses:
   CHAS. M. MOTTER,
   LEWIS SELL, Jr.